United States Patent
Chan et al.

(10) Patent No.: US 7,694,050 B1
(45) Date of Patent: Apr. 6, 2010

(54) METHOD AND SYSTEM FOR ADDRESSING MULTIPLE INSTANCES OF A SAME TYPE OF DEVICE ON A BUS

(75) Inventors: Wai C. Chan, Sunnyvale, CA (US); Hon K. Chiu, Hayward, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 912 days.

(21) Appl. No.: 11/268,057

(22) Filed: Nov. 7, 2005

(51) Int. Cl.
 *G06F 13/00* (2006.01)
(52) U.S. Cl. .................. 710/110; 710/104; 710/107
(58) Field of Classification Search .......... 710/104, 710/107, 110
 See application file for complete search history.

(56) References Cited

U.S. PATENT DOCUMENTS

| | | | |
|---|---|---|---|
| 4,918,598 A | * | 4/1990 | Ashkin et al. ............ 710/3 |
| 5,703,617 A | * | 12/1997 | Callahan et al. ............ 345/98 |
| 6,754,746 B1 | | 6/2004 | Leung et al. |
| 6,862,286 B1 | | 3/2005 | Tams et al. |
| 2006/0123168 A1 | * | 6/2006 | Lang .................... 710/110 |
| 2007/0024904 A1 | * | 2/2007 | Baer et al. ............ 358/1.16 |

OTHER PUBLICATIONS

Yu Chen et al., "Dynamic Home Agent Reassignment in Mobile IP", IEEE (2002), pp. 44-48.
Bertrand Le Gal et al., "Pipelined Memory Controllers for DSP Applications Handling Unpredictable Data Accesses", Proceedings of the IEEE Computer Society Annual Symposium on VLSI, 2005, 2 pages.

* cited by examiner

*Primary Examiner*—Mark Rinehart
*Assistant Examiner*—Jeremy S Cerullo

(57) ABSTRACT

A method for addressing multiple instances of a same type of slave device on a bus is provided that includes receiving a plurality of unique device addresses at each of the slave devices and overwriting a default device address in each of the slave devices with a different one of the unique device addresses.

20 Claims, 3 Drawing Sheets

US 7,694,050 B1

METHOD AND SYSTEM FOR ADDRESSING MULTIPLE INSTANCES OF A SAME TYPE OF DEVICE ON A BUS

TECHNICAL FIELD OF THE INVENTION

The present invention relates generally to addressing devices on a bus and, more particularly, to a method and system for addressing multiple instances of a same type of device on a bus.

BACKGROUND OF THE INVENTION

An inter-integrated circuit ($I^2C$) bus is a commonly used two-wire serial bus that has a simple, low-bandwidth, short-distance protocol. Using the addressing scheme associated with $I^2C$, multiple devices may be linked together relatively easily without the need for chip select or arbitration logic.

$I^2C$ bus systems include at least one master device and one or more slave devices. With each transaction, the master device transmits the device address of the intended slave. Each slave device is then responsible for monitoring the bus and responding only when its address is transmitted with the transaction.

Each slave device generally has a predefined address, with the exception of the lower bits that may be configurable at the board level. Thus, the $I^2C$ addressing scheme limits the number of identical slave devices that may be supported on an $I^2C$ bus without contention based on the number of user-configurable address bits. This number is typically two bits, which limits the number of identical slave devices to four.

One solution to allow additional devices of the same type to have unique device addresses is to include additional address pins on the slave devices. However, this solution may be costly, especially when the number of identical devices is large. A second solution involves the use of a dedicated $I^2C$ multiplexer that breaks the system into sub-branches. However, this solution increases the system busing (adds a clock and a data line) for each multiplexer used, thereby raising the system cost and complexity.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
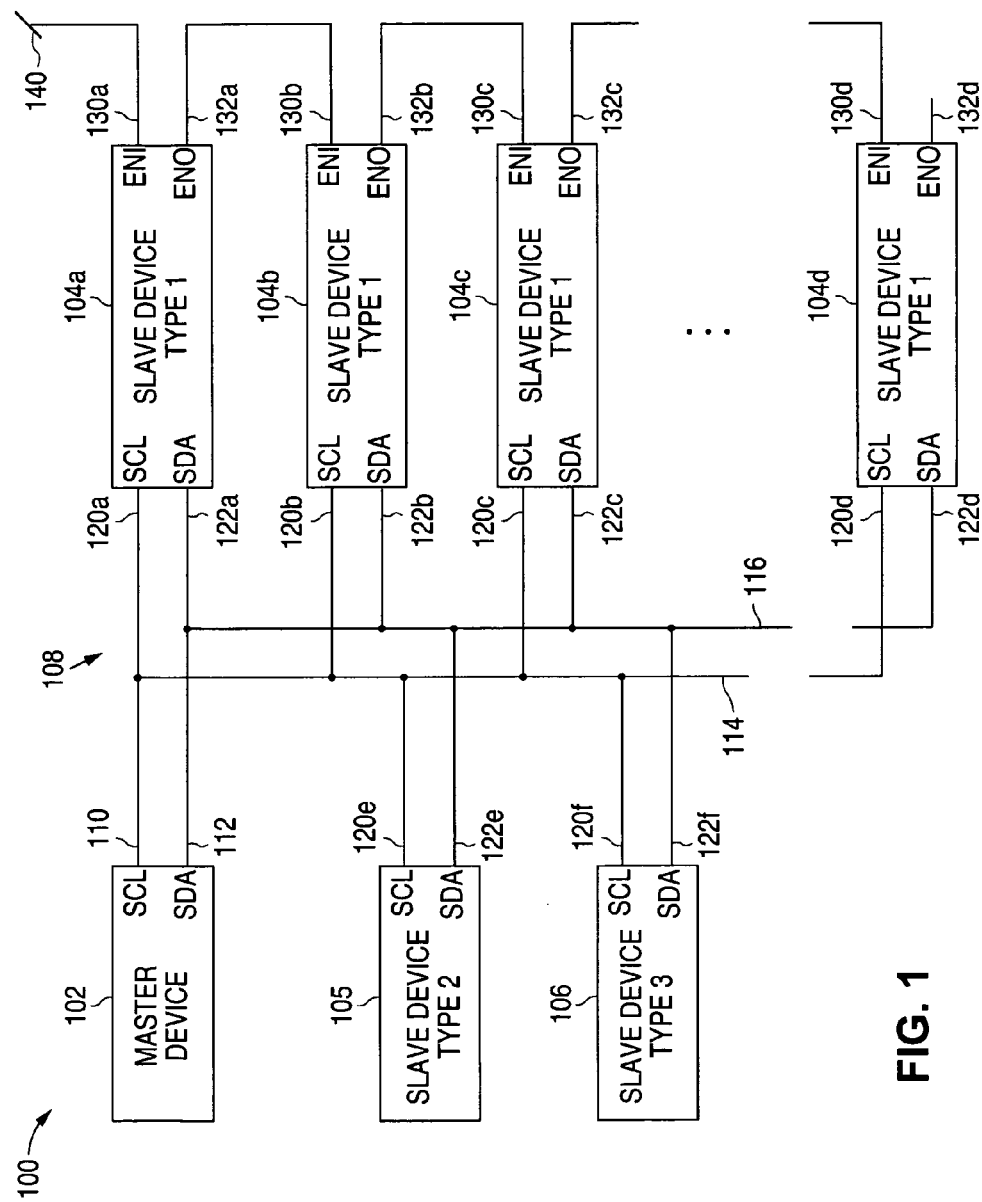
FIG. 1 is a block diagram illustrating a bus system operable to provide for the addressing of multiple instances of a same type of slave device in accordance with one embodiment of the present invention.
Figure 2:
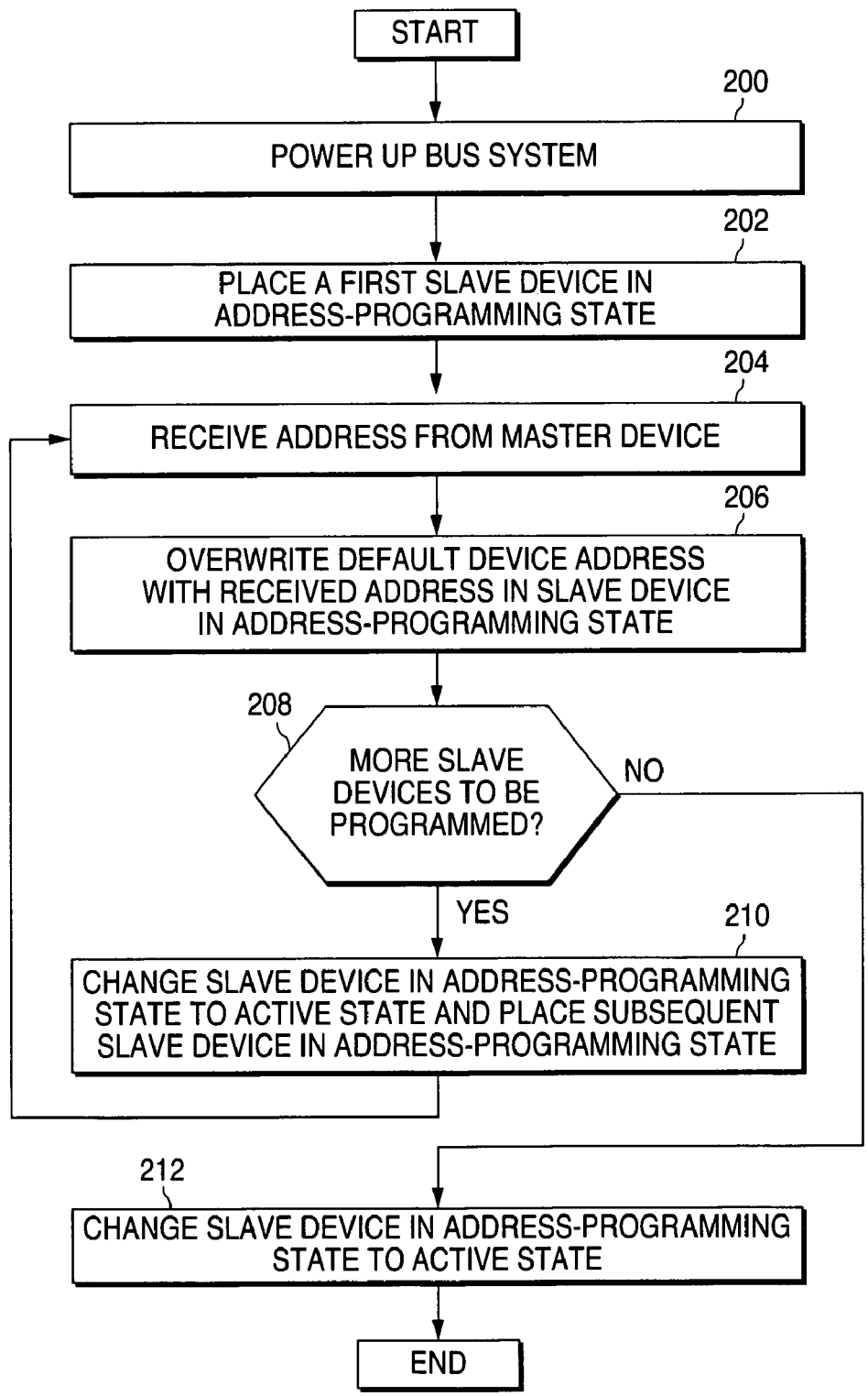
FIG. 2 is a flow diagram illustrating a method for addressing multiple instances of a same type of slave device in accordance with one embodiment of the present invention.
Figure 3:
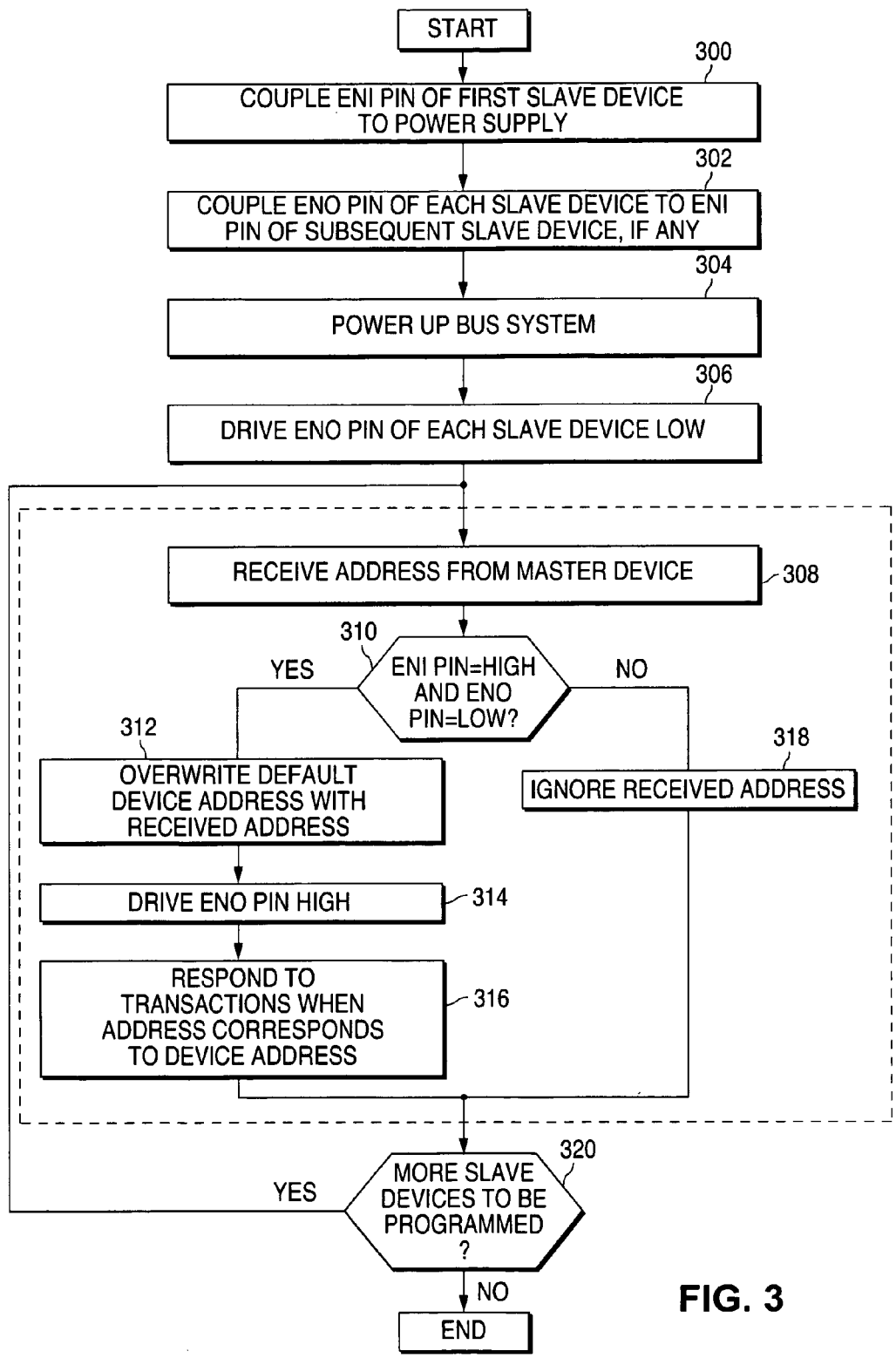
FIG. 3 is a flow diagram illustrating a method for addressing multiple instances of a same type of slave device in accordance with another embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged bus system.

FIG. 1 is a block diagram illustrating a bus system 100 operable to provide for the addressing of multiple instances of a same type of slave device in accordance with one embodiment of the present invention. The bus system 100 comprises at least one master device 102 and a plurality of slave devices 104-106 that are operable to communicate over a two-wire serial bus 108. For a particular embodiment, the master device 102 may comprise a CPU or microcontroller for the bus system 100.

The bus system 100 illustrated in FIG. 1 comprises a plurality of a first type of slave devices 104a-d, a second type of slave device 105, and a third type of slave device 106. It will be understood, however, that the bus system 100 may comprise any suitable number of types of slave devices 104-106 and may comprise any suitable number of each particular type of slave device 104-106 without departing from the scope of the present invention.

The bus 108 may comprise an inter-integrated circuit ($I^2C$) bus, a System Management (SM) bus, an Access bus, or other type of bus in which each type of slave device 104, 105 and 106 has an associated default device address. Because of this, the number of a particular type of slave device 104, 105 or 106 that may be included in the bus system 100 with unique default device addresses is limited. For example, each of the slave devices 104a-d may comprise a same default device address because these slave devices 104a-d are each the same type of device, while the slave devices 105 and 106 each comprise a different default device address from the slave devices 104 and from each other.

The master device 102 comprises a serial clock (SCL) pin and a serial data (SDA) pin 112. The master device 102 is operable to provide a clock signal from the serial clock pin 110 to a serial clock line 114 of the bus 108 and to send data signals from the serial data pin 112 to a serial data line 116 of the bus and receive data signals from the serial data line 116 of the bus 108 at the serial data pin 112. As described in more detail below, the master device 102 is also operable to provide unique device addresses for each of a plurality of slave devices 104a-d of the same type.

Each slave device 104-106 comprises a serial clock pin and a serial data pin 122. Each slave device 104-106 is operable to receive the clock signal at the serial clock pin 120 from the serial clock line 114 of the bus 108 and to send data signals from the serial data pin 122 to the serial data line 116 of the bus 108 and receive data signals from the serial data line 116 of the bus 108 at the serial data pin 122.

In addition, each slave device that comprises one slave device of a plurality of slave devices of the same type, such as slave devices 104a-d, comprises an enable input (ENI) pin 130 and an enable output (ENO) pin 132. Based on the conditions on these pins 130 and 132, each slave device 104a-d is operable to be placed into an address-programming state, an inactive state or an active state.

A slave device 104 in the address-programming state may overwrite its default device address with a new device address provided by the master device 102 over the bus 108. A slave device 104 in the inactive state ignores the data on the bus 108. A slave device 104 in the active state responds to transactions addressed to its device address.

For the embodiment in which the bus 108 comprises an I²C bus, the bus 108 is operable to support serial transmission of bytes of data. For each transaction initiated by the master device 102, the first byte is an addressing byte, with seven bits comprising a device address and one bit comprising a control bit.

In a typical transaction, the master device 102 issues a start condition. The master device 102 then sends a unique 7-bit slave device address, followed by a receive/transmit bit that specifies whether the addressed slave device 104-106 is to receive or transmit data for this transaction. The addressed slave device 104-106 may then send an acknowledgement bit to acknowledge receipt of the previous byte to the master device 102. The transmitter for this transaction, as indicated by the receive/transmit bit, then transmits a byte of data. After receiving the byte, the receiver may send an acknowledgement bit. The process may be repeated any number of times to complete the transaction.

For a transaction in which the slave device 104-106 is the receiver, the master device 102 issues a stop condition after receiving the final acknowledgement bit from the slave device 104-106. For a transaction in which the slave device 104-106 is the transmitter, the master device 102 issues a stop condition instead of sending a final acknowledgement bit to the slave device 104-106 after receiving the final byte of data from the slave device 104-106.

For a particular embodiment of the bus system 100, the ENI pin 130a of the first slave device 104a of a plurality of slave devices 104a-d of the same type is coupled to a power supply 140, which drives the ENI pin 130a high. Each ENO pin 132 is coupled to the ENI pin 130 of a subsequent slave device 104 of the same type, if any. Thus, the ENO pin 132d of the final slave device 104d is not coupled to another slave device 104.

Upon power-up of the bus system 100, the slave devices 104a-d drive their ENO pins 132a-d low. For this embodiment, a slave device 104 is placed in the address-programming state when its ENI pin 130 is high and its ENO pin 132 is low. In addition, when both pins 130 and 132 are low, the slave device 104 is in the inactive state, and when both pins 130 and 132 are high, the slave device 104 is in the active state.

Thus, upon power-up, the first slave device 104a is in the address-programming state because its ENI pin 130a is high and its ENO pin 132a is low. The remaining slave devices 104b-d are in the inactive state because their ENO pins 132b-d have been driven low, and their ENI pins 130b-d are each coupled to an ENO pin 132a-c which causes their ENI pins 130b-d to be low also.

At this point, the master device 102 sends a unique device address to the serial data line 116. Because the first slave device 104a is in the address-programming state, this slave device 104a stores the device address provided by the master device 102 in place of its default device address, while the remaining slave devices 104b-d ignore the device address.

After storing the device address, the first slave device 104a drives its ENO pin 132a high, changing itself from the address-programming state to the active state. This also causes the ENI pin 130b of the second slave device 104b to be driven high, resulting in the second slave device 104b being changed from the inactive state to the address-programming state.

The master device 102 then sends another unique device address to the serial data line 116. Because the second slave device 104b is in the address-programming state, this slave device 104b stores the device address provided by the master device 102 in place of its default device address and then drives its ENO pin 132b high.

This process is repeated until each slave device 104 has overwritten its default device address with a unique device address provided by the master device 102. After finishing the process, each slave device 104 is also in the active state and ready to respond to transactions addressed to its unique device address.

Although the embodiment described above provides a particular implementation of the bus system 100, it will be understood that the slave devices 104 may be coupled together in any other suitable manner to allow for successively placing a single slave device 104 in the address-programming state without departing from the scope of the present invention. For example, the ENI pin 130a of the first slave device 104a to be programmed may be coupled to ground and the ENO pins 132 may be driven high on power-up. For this embodiment, the slave devices 104 may be placed in the address-programming state based on a low ENI pin 130 and a high ENO pin 132, in the active state based on a low ENI pin 130 and a low ENO pin 132, and in the inactive state based on a high ENI pin 130 and a high ENO pin 132.

FIG. 2 is a flow diagram illustrating a method for addressing multiple instances of a same type of slave device, such as slave devices 104a-d, in accordance with one embodiment of the present invention. The method begins with step 200 where the bus system 100 is powered up.

At step 202, a first slave device 104a is placed in the address-programming state. At step 204, the slave devices 104-106 receive a unique device address from the master device 102 over the bus 108. At step 206, the first slave device 104a overwrites its default device address with the received device address, while the other slave devices 104-106 ignore the device address.

At decisional step 208, the master device 102 makes a determination regarding whether or not there are more slave devices 104 to be programmed with a unique device address. If there are more slave devices 104 to be programmed, the method follows the Yes branch from decisional step 208 to step 210. At step 210, the slave device 104 in the address-programming state, which is originally the first slave device 104a, is changed to the active state, while a subsequent slave device 104, such as the second slave device 104b, is placed in the address-programming state. The method then returns to step 204, where the slave devices 104-106 receive a subsequent unique device address from the master device 102 over the bus 108 for the subsequent slave device 104.

Returning to decisional step 208, if there are no more slave devices 104 to be programmed, the method follows the No branch from decisional step 208 to step 212. At step 212, the slave device 104 in the address-programming state, for example, the last slave device 104d, is changed to the active state. At this point, each slave device 104a-d of the same type has been programmed with a unique device address and placed in the active state, and the method comes to an end.

FIG. 3 is a flow diagram illustrating a method for addressing multiple instances of a same type of slave device, such as slave devices 104a-d, in accordance with another embodiment of the present invention. The method begins with step 300 where the ENI pin 130a of the first slave device 104a is coupled to the power supply 140, which drives the ENI pin 130a high. At step 302, the ENO pin 132 of each slave device 104 of the same type is coupled to the ENI pin 130 of a subsequent slave device 104 of the same type if there is a subsequent slave device 104. Thus, the ENO pin 132d of the last slave device 104d is not coupled to another slave device 104. At step 304, the bus system 108 is powered up. At step 306, each slave device 104 drives its ENO pin 132 low.

At this point, steps 308-318, which are indicated by the dotted lines, are performed by each slave device 104 individually for each of a number of address-programming iterations. At step 308, the slave device 104, in addition to the other slave devices 104-106, receives a unique device address from the master device 102 over the bus 108.

At decisional step 310, the slave device 104 makes a determination regarding whether its ENI pin 130 is high and its ENO pin 132 is low. If the ENI pin 130 is high and the ENO pin 132 is low, the slave device 104 overwrites its default device address with the received device address at step 312. At step 314, the slave device 104 drives its ENO pin 132 high. At step 316, the slave device 104 responds to transactions on the bus 108 when the device address for the transaction corresponds to the slave device's 104 new device address.

Returning to decisional step 310, if the slave device 104 does not determine that its ENI pin 130 is high and its ENO pin 132 is low, the slave device 104 ignores the address received from the master device 102 at step 318.

Thus, after steps 308-318, one of the slave devices 104 has a new device address and the device addresses of the remaining slave devices 104-106 remain unchanged. In addition, by driving its ENO pin 132 high, the slave device 104 with the new device address drives the ENI pin 130 of the subsequent slave device 104, if any, high.

At this point, the master device 102 makes a determination at decisional step 320 regarding whether or not there are more slave devices 104 to be programmed with a unique device address. If there are more slave devices 104 to be programmed, the method follows the Yes branch from decisional step 320 and returns to step 308, where each of the slave devices 104-106 receives a subsequent unique device address from the master device 102 over the bus 108. However, if there are no more slave devices 104 to be programmed, each slave device 104a-d of the same type has been programmed with a unique device address and placed in the active state, and the method comes to an end.

Although the present invention has been described with several embodiments, various changes and modifications may be suggested to one skilled in the art. It is intended that the present invention encompass such changes and modifications as fall within the scope of the appended claims.

What is claimed is:

1. A method for addressing multiple instances of a same type of slave device on a bus, comprising:
   placing one of a plurality of slave devices having a default device address in an address-programming state;
   placing a remainder of the slave devices in an inactive state;
   receiving one of a plurality of unique device addresses at each of the slave devices; and
   overwriting the default device address of the slave device in the address-programming state with the unique device address;
   wherein each of the remainder of the slave devices having a default device address that is not being overwritten remains in an inactive state.

2. The method of claim 1, further comprising:
   placing each of the remainder of the slave devices in the address-programming state one at a time;
   receiving one of the unique device addresses while each slave device is in the address-programming state; and
   overwriting the default device address in the slave device in the address-programming state with the unique device address received while the slave device is in the address-programming state.

3. The method of claim 2, further comprising powering up a bus system, the bus system comprising the slave devices, the bus and a master device.

4. The method of claim 3, placing each of the slave devices in the address-programming state comprising placing each of the slave devices in the address-programming state in response to powering up the bus system.

5. The method of claim 3, receiving the unique device addresses further comprising receiving the unique device addresses from the master device.

6. The method of claim 3, the bus comprising an inter-integrated circuit bus.

7. The method of claim 2, further comprising placing each of the slave devices in an active state after overwriting the default device address in the slave device.

8. A method for addressing multiple instances of a same type of slave device on a bus, comprising:
   determining a condition on an enable input (ENI) pin and a condition on an enable output (ENO) pin at each of the slave devices; and
   placing each of the slave devices into one of a plurality of states based on the condition on the ENI pin and the condition on the ENO pin at each of the slave devices, the plurality of states comprising an address-programming state and an active state, wherein placing each of the slave devices into one of the states comprises placing a single one of the slave devices into the address-programming state when the condition on the ENI pin has a first value and the condition on the ENO pin has a second value at the single slave device.

9. The method of claim 8, further comprising:
   coupling the ENI pin at a first of the slave devices to a power supply;
   coupling the ENO pin at each of the slave devices to the ENI pin at a subsequent one of the slave devices when a subsequent slave device exists;
   powering up a bus system, the bus system comprising the slave devices, the bus and a master device; and
   driving the ENO pin at each of the slave devices to the second value after powering up the bus system.

10. The method of claim 9, further comprising receiving a unique device address while the single slave device is in the address-programming state.

11. The method of claim 10, further comprising:
overwriting a default device address in the single slave device in the address-programming state with the unique device address received while the single slave device is in the address-programming state; and
driving the ENO pin at the single slave device in the address-programming state to the first value after overwriting the default device address.

12. The method of claim 11, placing each of the slave devices into one of the states based on the condition on the ENI pin and the condition on the ENO pin at each of the slave devices comprising placing at least one slave device into the active state when the condition on the ENI pin has the first value and the condition on the ENO pin has the first value at the at least one slave device.

13. The method of claim 9, the plurality of states further comprising an inactive state.

14. The method of claim 13, placing each of the slave devices into one of the states based on the condition on the ENI pin and the condition on the ENO pin at each of the slave devices comprising placing at least one slave device into the inactive state when the condition on the ENI pin has the second value and the condition on the ENO pin has the second value at the at least one slave device.

15. The method of claim 9, the bus comprising an inter-integrated circuit bus.

16. A system for addressing multiple instances of a same type of slave device on a bus, comprising:
a master device operable to provide a plurality of unique device addresses;
a plurality of slave devices of a same type; and
a bus operable to provide communication between the master device and the slave devices;
wherein each of the slave devices is operable to overwrite a default device address in the slave device with a different one of the unique device addresses provided by the master device and wherein each of the remaining slave devices having a default device address that is not being overwritten remains in an inactive state.

17. The system of claim 16, each of the slave devices comprising an enable input (ENI) pin and an enable output (ENO) pin and further operable to determine a condition on the ENI pin and a condition on the ENO pin and to be placed into an address-programming state based on the condition on the ENI pin and the condition on the ENO pin at the slave device.

18. The system of claim 17, the ENI pin of a first of the slave devices coupled to a power supply, the ENO pin at each of the slave devices coupled to the ENI pin at a subsequent one of the slave devices when a subsequent slave device exists, each of the slave devices further operable to drive the ENO pin at the slave device to a first specified value after the system is powered up.

19. The system of claim 18, each of the slave devices further operable to drive the ENO pin at the slave device to a second specified value after overwriting the default device address in the slave device.

20. The system of claim 16, the bus comprising an inter-integrated circuit bus.

* * * * *

UNITED STATES PATENT AND TRADEMARK OFFICE
CERTIFICATE OF CORRECTION

PATENT NO. : 7,694,050 B1  Page 1 of 1
APPLICATION NO. : 11/268057
DATED : April 6, 2010
INVENTOR(S) : Wai C. Chan et al.

It is certified that error appears in the above-identified patent and that said Letters Patent is hereby corrected as shown below:

Column 2, line 63, insert --110-- after "pin";

Column 3, line 1, insert --108-- after "bus"; and

Column 3, line 6, insert --120-- after "pin".

Signed and Sealed this
Twenty-second Day of February, 2011

David J. Kappos
*Director of the United States Patent and Trademark Office*